United States Patent [19]

Maeno

[11] Patent Number: 4,653,883
[45] Date of Patent: Mar. 31, 1987

[54] WATERTIGHT CAMERA

[75] Inventor: Hiroshi Maeno, Tokyo, Japan

[73] Assignee: Canon Kabushiki Kaisha, Japan

[21] Appl. No.: 801,382

[22] Filed: Nov. 22, 1985

Related U.S. Application Data

[63] Continuation of Ser. No. 679,910, Dec. 10, 1984, abandoned.

[30] Foreign Application Priority Data

Dec. 12, 1983 [JP] Japan ................................ 58-191345
Dec. 12, 1983 [JP] Japan ................................ 58-191346
Dec. 14, 1983 [JP] Japan ................................ 58-192819

[51] Int. Cl.$^4$ ........................ G03B 15/03; G03B 17/08
[52] U.S. Cl. .................................. 354/64; 354/149.11
[58] Field of Search ............................ 354/64, 149.11

[56] References Cited

U.S. PATENT DOCUMENTS 4,281,837 8/1981 Hashimoto et al. ............. 354/64 X

FOREIGN PATENT DOCUMENTS 0100841 6/1983 Japan ..................................... 354/64

*Primary Examiner*—William B. Perkey
*Attorney, Agent, or Firm*—Toren, McGeady and Goldberg

[57] ABSTRACT

A watertight camera having incorporated therein a strobe device, wherein said strobe device and the camera body are connected with each other by a hollow pipe made watertight by an elastic member so that the strobe device is movable between a retracted position and a projected position, whereby said strobe device is held stationary either in the retracted position or in the projected position by the frictional force exerted from the elastic member to the hollow pipe.

30 Claims, 12 Drawing Figures

WATERTIGHT CAMERA

This is a continuation of application Ser. No. 679,910, filed Dec. 10, 1984, now abandoned.

BACKGROUND OF THE INVENTION

1. Field of the Invention

This invention relates to watertight cameras having displaceable strobe devices.

2. Description of the Prior Art

In general, in strobe device built-in cameras, if the distance between the center of the flash lamp and the optical axis of the photographic lens is short when in flash photography, the cameras will have the so-called "red eye" phenomenon, so that in the case of photographing a person, his pupil is photographed as red. To avoid such red eye, it is desirable to increase the distance between the flash lamp and the photographic lens. For example, in 35 mm cameras with next-to-standard wide angle lenses, the distance between these centers is empirically found to be preferably more than about 60 mm.

Further, in application to underwater flash photography, when the water contains many floating particles and, therefore, has diminished transparency, if the flash lamp A lies near the photographic lens B as shown in FIG. 1(a), light from the flash lamp A is reflected from dust particles C to the camera, with the result that such photographs appear as if snow were falling over the entire scene. To avoid this, as shown in FIG. 1(b), the flash lamp A must be put farther away from the photographic lens B so that the reflected light from dust particles C in suspension will not enter the lens. That is to say, even in underwater flash photography, the farther the flash lamp from the photographic lens, the better the result.

Meanwhile, in order to improve portability, it is desirable to minimize the bulk and size of the cameras. In the strobe built-in cameras, the flash lamp is necessarily positioned near the lens. For this reason, in recent years, a retractable strobe has found increasing use in cameras giving an advantage that when the strobe is not in use, the strobe is retracted into the interior of the camera housing to improve the portability, while when it is desired to perform flash photography, the strobe is extracted out of the camera housing to avoid production of the "red eye".

In the prior art of watertight cameras, however, it has been very difficult to assure the watertightness when the strobe is extracted or projected in water. Therefore, to avoid producing the "red eye", the strobe was fixedly mounted within the camera housing. Or otherwise, though the strobe was allowed to remain within the camera, to achieve avoidance of the "red eye", the size of the camera was increased.

Recently though, a watertight camera having a strobe device made pivotally movable between a chamber therefor and a projected position has been proposed in Japanese Laid-Open Utility Model Application No. SHO 58-71727.

This watertight camera allows for assurance of watertightness during the movement of the strobe. But, as shown in FIG. 2(a), because the shaft 23 about which the strobe unit 22 turns lies at the side of the camera body 21, when the strobe unit 22 is in the projected position, the strength against the external pressure is not sufficient. Particularly since the watertight camera is often used under water, a large external force is applied to the strobe unit 22 and there is a high possibility of breaking the connection between the camera body 21 and the strobe unit 22 at the shaft 23.

Another feature of this prior known watertight camera is that all the walls of the chamber 21a for the strobe unit 22 are flat. With the strobe unit 22 snugly accommodated in the chamber, therefore, when water 24 encloses the narrow gap therebetween as shown in FIG. 2(b), the force necessary to pull out the strobe unit 22 is substantially increased by the surface tension of water layer. Particularly after the camera was used in the sea, as the water is evaporated leaving salt crystals behind, the difficulty of pulling out the strobe unit is intensified. Moreover, there is some possibility of heavily eroding the walls of the chamber and the casing of the strobe unit.

SUMMARY OF THE INVENTION

An object of the present invention is to eliminate the above-described drawbacks, and to provide a watertight camera in which a strobe unit is movably connected to the camera body through a hollow pipe which is sealed against water by an elastic member, and this elastic member is made to also serve to hold the strobe unit stationary in the retracted position and in the projected or extracted position.

Another object of the invention is to provide a watertight camera in which either or both of the confronting surfaces of the strobe unit and the chamber therefor is or are provided with grooves or rails for draining water, whereby the amount of water left in the narrow space between the strobe unit and the walls of the chamber is largely reduced.

Still another object of the invention is to provide a watertight camera in which one side wall of the strobe unit casing is formed in a semi-circular shape at its center at which the aforesaid hollow pipe is mounted to the strobe unit, while that wall of the strobe chamber which confronts the semi-circular side of the strobe unit is curved in conformity therewith, and the other walls are formed with a flat shape, whereby the strobe unit is pivotally movable between the retracted and projected positions, while still maintaining sufficient strength of the connection between the strobe unit and the camera body.

Other objects and features of the invention will become apparent from the following description of embodiments thereof.

DETAILED DESCRIPTION OF THE PREFERRED EMBODIMENTS

An embodiment of the present invention is next be described by reference to FIGS. 3 and 4.

Figure 1A:
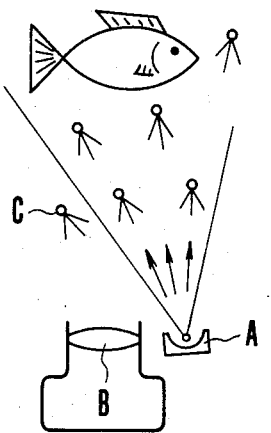
FIG. 1(a) is a schematic view of underwater flash photography.
Figure 1B:
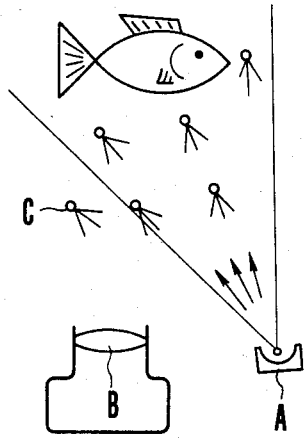
FIG. 1(b) is similar to FIG. 1(a) except that the flash unit is positioned farther away from the photographic lens.
Figure 2A:
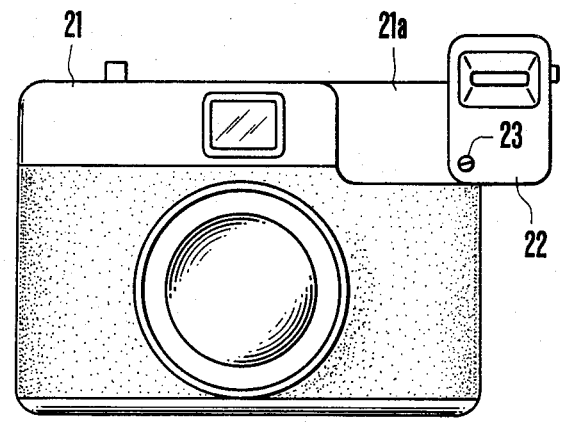
FIG. 2(a) is a front elevational view of a prior art watertight camera.
Figure 2B:
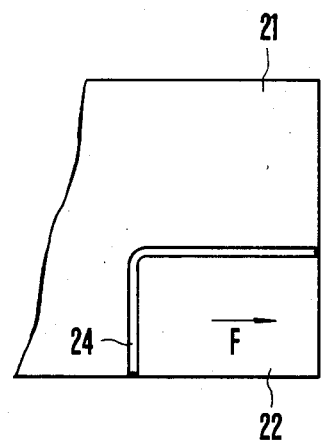
FIG. 2(b) is a fragmentary section view illustrating how water is trapped in between the strobe unit and the chamber therefor in the camera of FIG. 2(a).
Figure 3A:
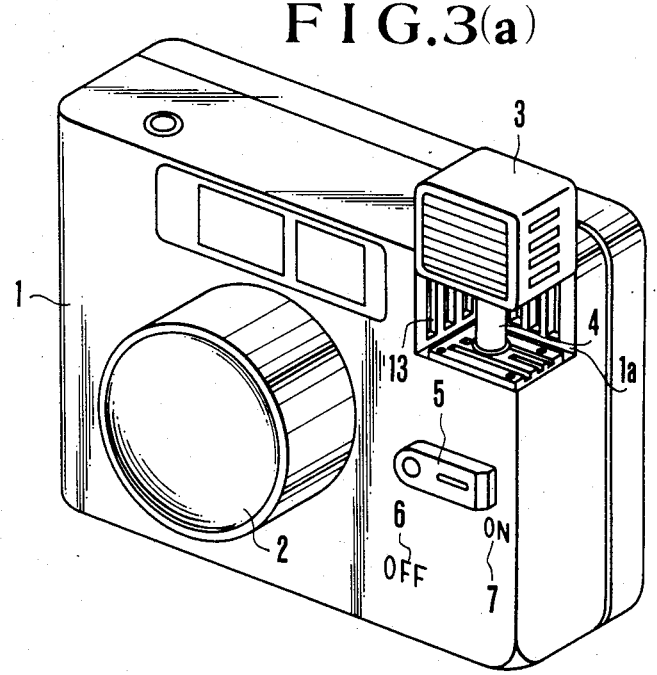
FIG. 3(a) is a perspective view illustrating the outer appearance of an embodiment of a watertight camera according to the present invention.

In FIG. 3(a) there is shown a watertight camera having incorporated therein a strobe device. A camera body 1 has a recessed portion 1a for a flash lamp of the strobe device and fixedly carries a photographic lens 2. This flash lamp 3 is movably connected to the camera body 1 through a hollow pipe 4. An operating knob 5 has an OFF position 6 and an ON position 7 where when the flash lamp 3 is in the projected position an electrical power source for the flash lamp 3 is energized. The three side walls of the chamber 1a with which the casing of the flash lamp 3 are in contact, are provided with water draining grooves 13. These draining grooves may be otherwise provided in the casing of the flash lamp 3.

Figure 3B:
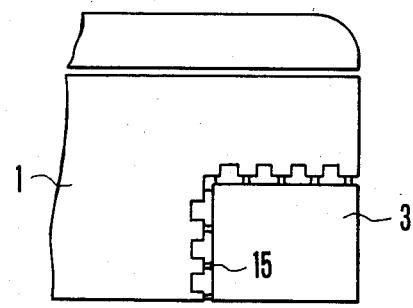
FIG. 3(b) is a fragmentary section view illustrating how the amount of water trapped in between the strobe unit and the walls of the chamber therefor is reduced.

The use of such water draining grooves 13 can reduce the total area of the water layers 15 between the flash lamp casing 3 and the camera body 1 as shown in FIG. 3(b), with decrease in the resisting force of the surface tension of water layers 15 against the pulling out of the flash lamp 3. Another advantage arising from the reduction of the amount of water left is that the possibility of eroding the coated surface or the metal surface is largely reduced.

Figure 4A:
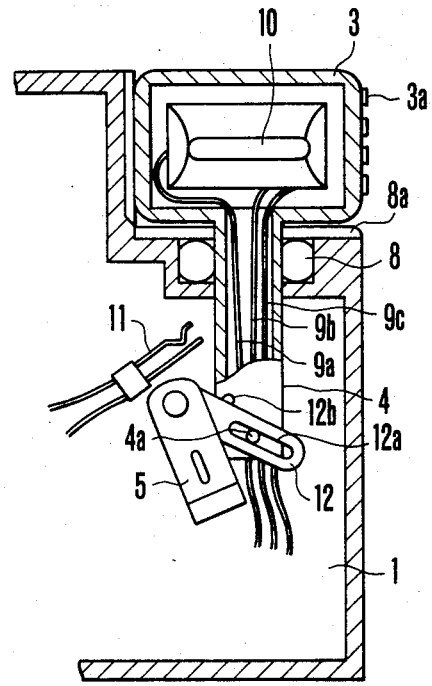
FIGS. 4(a) and 4(b) are sectional views of the strobe unit and an operating mechanism therefor in the retracted and projected positions respectively.
Figure 4B:
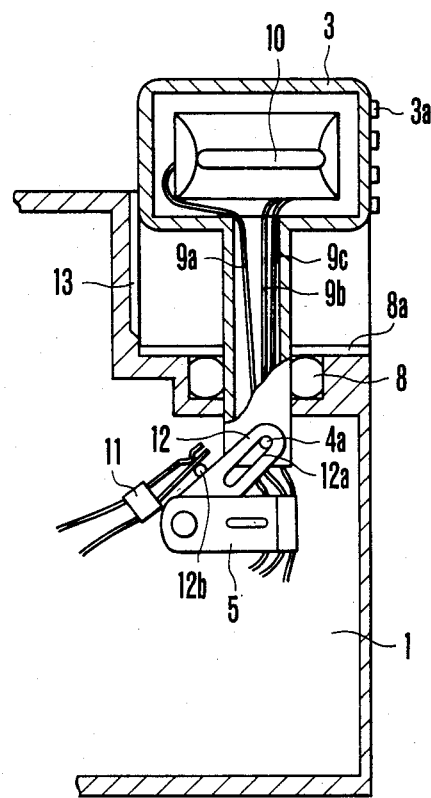

FIGS. 4(a) and 4(b) concretely illustrate the construction of coupling portions of the camera body 1 and the flash lamp casing 3 of the strobe device. A water seal packing 8 made of elastic material is provided between the pipe 4 and the camera body 1 to maintain watertightness of the pipe 4 during sliding movement thereof. This water seal packing 8 is fitted in a recess of the bottom wall of the chamber for the flash lamp casing 3 and is retained in a compressed state by a plate 8a.

Within the casing 3 there is a discharge tube 10 having plus, minus and trigger electrodes connected to lead wires 9a, 9b and 9c respectively. These lead wires 9a, 9b and 9c pass through the hollow core of the pipe 4 into the interior of the camera housing 1. A power switch 11 for the discharge tube 10 is positioned adjacent an actuator protuberance 12b on a lever 12 which is fixedly secured to the operating knob 5 so that when the knob 5 is turned to the ON position, the power switch 11 is closed. The lever 12 is provided with an elongated slot 12a in which engages a pin 4a radially extending from the hollow pipe 4.

While the conventional strobe units are generally ejected by a spring force, in the embodiment of the invention because the packing 8 is compressed radially on the pipe 4 to maintain watertightness, due to its frictional force, it is very difficult to eject the strobe unit by a spring force.

In this embodiment, therefore, by turning the knob 5 in the counterclockwise direction, the hollow pipe 4 is lifted upward by the lever 12 engaging the radial pin 4a. Or otherwise, the photographer may grasp the flash lamp casing 3 at a knurl 3a and pull up the casing 3, whereby the lever 12 is turned through the pin 4a-and-slot 12a connection, and the switch 11 is closed by the protuberance 12b to render a strobe circuit operative. Such strobe circuit is well known in the art, and, therefore, is not described here.

And, the flash lamp casing 3 is held stationary either in the retracted position or in the projected position by the frictional force of the packing 8.

It should be also pointed out that because the walls of the chamber 1a for the flash lamp casing 3 are provided with the water draining grooves 13, the area of water trapped therebetween can be reduced to make it easy for the photographer to move the flash lamp casing 3.

After the flash exposure has been completed, when it is desired to collapse the flash lamp casing 3 into the chamber, the photographer needs only to push down directly the flash lamp casing 3 with his hand, or to turn the knob 5 in the clockwise direction. In this case, the protuberance 12b of the moving lever 12 is taken out of contact with the movable contact of the switch 11, and the operation of the strobe circuit is stopped.

It should be pointed out again that when a pin for engagement in one of the grooves 13 is used on the flash lamp casing 3, that groove can serve as a guide.

Now let us consider what magnitude of frictional force must be exerted by the water seal packing 8 on the pipe 4 to assure that the flash lamp casing 3 holds itself stationary in the projected position under water. For the given outer diameter, d cm, of the pipe 4, its cross-section area is $\pi d^2/4$. Under water, the pressure is increased by about 1 atmospheric pressure (1 kgf/cm$^2$) per 10 meters. The projected flash lamp casing 3 receives a larger pressure from above than from the bottom by a magnitude corresponding to the cross-sectional area of the pipe 4.

On the assumption that the degree of watertightness of the camera is not necessarily far higher than for example, 10 meters in depth of water, in order to prevent the flash lamp casing 3 from being collapsed at 10 meters deep, the required value of frictional force is determined as:

$$\pi d^2/4 \times 1 \text{ (atmospheric pressure)} = 0.78 \times d^2$$

Hence, the packing 8 has to be compressed so that a larger frictional force than 0.78 d$^2$ kgf is obtained between the pipe 4 and the packing 8.

It is to be noted that as the packing 8, use may be made of an O ring, X ring, D ring, or other water seal members. Also the hollow pipe 4 is not necessarily of round cross-section, but may be oval, or square with its corners rounded. Rather, shapes other than round are advantageous for preventing the angular position of the flash lamp casing 3 from being accidentally changed.

As has been described above, a hollow pipe is used for connecting the built-in strobe and the camera body, lead wires are passed through the inside thereof, and an O ring or other packing is applied on the outside thereof, whereby the flash lamp can be ejected, while the water-tightness is maintained. Therefore, when the strobe is not in use, the portability is improved. And, when the strobe is in use, the "red eye" effect is reduced, and the photographs taken under water with illumination from the flash lamp can be prevented from having lowered image quality.

Another embodiment of the invention is described by reference to FIGS. 5 to 7(a) and 7(b) wherein the same reference characters have been employed to denote similar parts to those shown in connection with the first embodiment.

Figure 5:
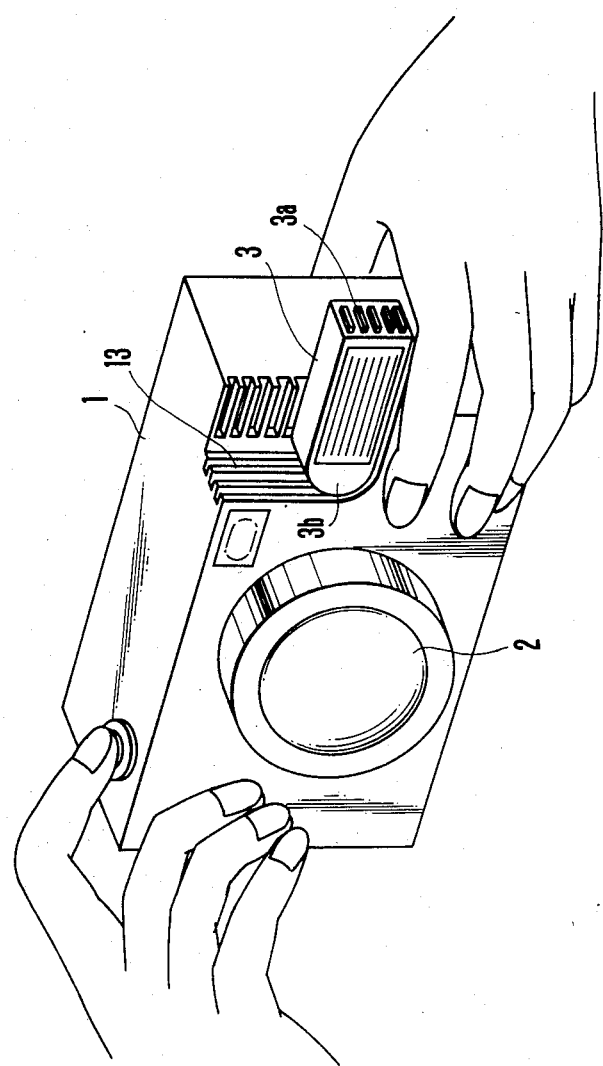
FIG. 5 is a perspective view illustrating the outer appearance of another embodiment of the watertight camera according to the invention.

In FIG. 5, the camera body 1 has the photographic lens 2 and a firing portion of the built-in strobe device, or flash lamp casing 3. This flash lamp casing 3 is coupled with the camera body 1 by a rotatable hollow pipe 4 relative to the camera body. A number of water draining grooves 13 are formed in the walls of the chamber for the flash lamp casing 3. These water draining grooves may be otherwise provided in the flash lamp casing.

The use of such water draining grooves can reduce the total area of water layers trapped between the chamber and the flash lamp casing 3 with decrease in the resisting force against pulling out of the flash lamp casing due to the surface tension of the water layers. Also because little water is left, the possibility of eroding the coated surface or metal surface is reduced.

Figure 6:
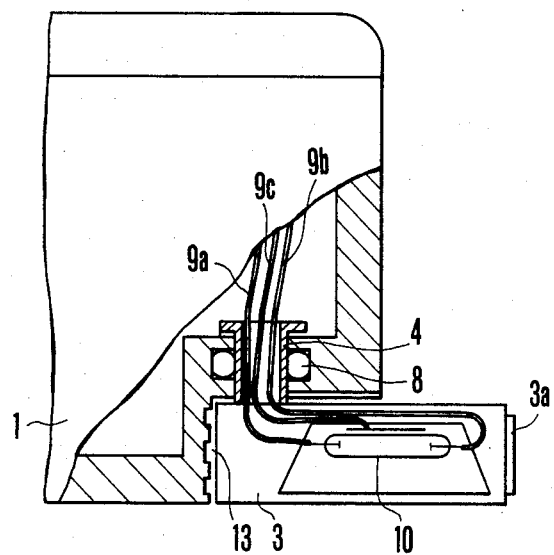
FIG. 6 is a sectional view illustrating the details of the connection between the strobe unit and the camera body of FIG. 5.

Here, FIG. 6 concretely illustrates coupling portions of the camera body 1 and the flash lamp casing 3. A water seal packing 8 is provided between the pipe 4 and the camera body 1 to maintain watertightness of the pipe 4 during the rotation thereof. This water seal packing 8 is fitted in a recess of the rear wall of the chamber for the flash lamp casing 3.

Lead wires 9a, 9b and 9c for firing a discharge tube 10 within the casing 3 are connected at their ends to a plus terminal, a minus terminal and a trigger terminal of the discharge tube 10 respectively, the other ends of which pass through the hollow core of the pipe 4 into the interior of the camera body 1.

And, the upper side of the flash lamp casing 3 is provided with a knurl 3a as shown in FIG. 5, and its lower side is formed to a semi-circular shape 3b. Also, the corners of the left and bottom walls of the chamber 1a are rounded as indicated at 1a1 in FIG. 7(a) in conformity with the semi-circular portion of the flash lamp casing 3. A right hand half of the bottom wall is left flat as indicated at 1a2.

When it is desired to make a flash exposure, the photographer first puts his finger on the knurl 3a of the flash lamp casing 3 and then turns the flash lamp casing 3 in a clockwise direction as viewed in FIG. 5.

Such movement of the flash lamp casing 3 causes the lead wires 9a, 9b and 9c in the hollow pipe 4 to be twisted. But, since the angle of rotation is limited to 90°, and the rotation is reciprocally carried out, there is no possibility of breaking the lead wires. Also, because a packing 8 such as an O ring intervenes between the outside of the pipe 4 and the camera body 1, even when the flash lamp casing 3 is turned on under water, no water is allowed to enter the interior of the camera body 1.

It should be also pointed out that even in the projected position, the flash lamp casing 3 is borne not only by the connection pipe 4 but also by the curved and flat surfaces 1a1 and 1a2 of the chamber 1a contacting with the right hand half of the semi-circular portion 3b and the right side of the flash lamp casing 3 respectively. Therefore, the presence of this contact reinforces the erection of the flash lamp casing against external shock.

The walls of the chamber 1a with which the flash lamp casing 3, when retracted, comes to contact are provided with water draining grooves 13 to effect smooth motion of the flash lamp casing 3. These water draining grooves 13 may be otherwise provided in the flash lamp casing 3.

Thereby, the total area of the water layers between the flash lamp casing 3 and the camera body is reduced with decrease in the resisting force against ejecting the flash lamp casing 3 due to the surface tension of the water layer. Therefore, the flash lamp casing 3 becomes easy to pull out. Another advantage is to reduce the possibility of eroding the coated surfaces of the chamber.

Figure 7A:
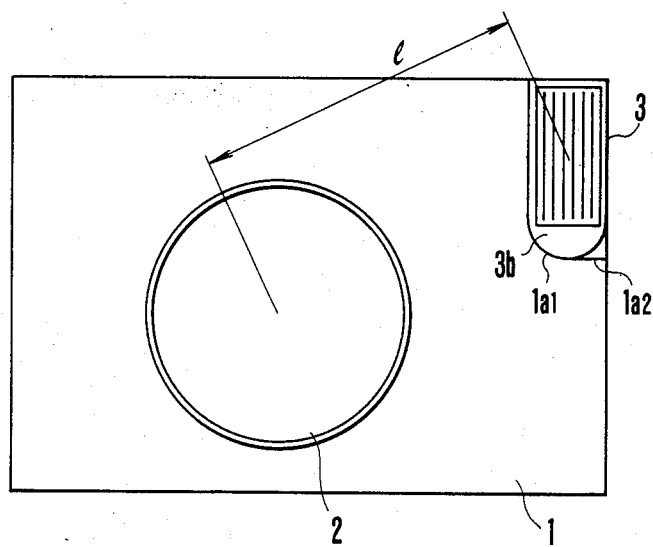
FIGS. 7(a) and 7(b) are front elevational views of the camera of FIG. 5 in the retracted and projected positions respectively with an effect of the invention.
Figure 7B:
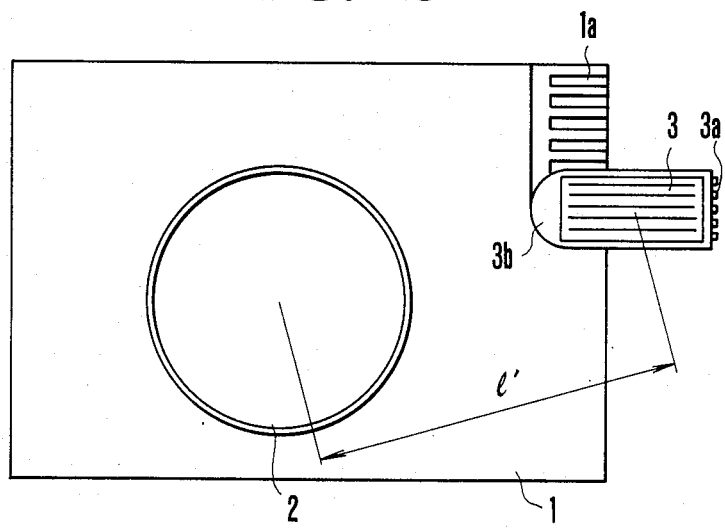

Also, the distance between the center of the area of the luminous window of the flash lamp casing 3 and the optical axis of the photographic lens 2 is increased from l to l', when the flash lamp casing 3 is moved from the retracted position of FIG. 7(a) to the popped position of FIG. 7(b). That is to say, for persons which are to be photographed, the "red eye" effect is reduced. In underwater photography too, the image quality can be improved.

As has been described in great detail above, according to the present invention, either or both of the confronting surfaces of the firing portion of the strobe device and the camera body is or are provided with water draining grooves with the advantage that when photographing in rain, or just after an exit from under water, water is not trapped in between the flash lamp casing and the camera body. whereby the force necessary to pull out the flash lamp casing from the chamber is reduced. Also, the end portion of the firing portion of the strobe device is formed to a semi-circular shape, and that wall of the chamber for the firing portion which confronts the semi-circular portion is partly curved, while the other part is left flat, whereby the firing portion of the strobe device is made rotatable between the retracted position and the projected position while still maintaining sufficient strength of the firing portion against the external shock when the firing portion is in the projected position.

What is claimed is:

1. A watertight camera comprising:
   (a) a camera body;
   (b) a strobe device attached to said camera body, said device including a firing portion movable between a retracted position and a projected position;
   (c) a hollow pipe connecting said firing portion with said camera body, said hollow pipe including a movable portion for moving said firing portion; and
   (d) an elastic member for sealing said movable portion of said hollow pipe against water,
      said elastic member exerting a frictional force on said hollow pipe to hold stationary said firing portion in either of said retracted or projected positions.

2. A watertight camera according to claim 1, wherein said movable portion of said hollow pipe is slidingly movable relative to said camera body.

3. A watertight camera according to claim 1, wherein said movable portion of said hollow pipe is rotatable relative to said camera body.

4. A watertight camera according to claim 1, wherein said hollow pipe is formed as a unit with said firing portion.

5. A watertight camera comprising:
   (a) a camera body;

(b) a strobe device incorporated in said camera body, said device including a firing portion movable between a retracted position and a projected position;

(c) a hollow pipe connecting said firing portion with said camera body,
said hollow pipe including a movable portion for moving said firing portion;

(d) an elastic member for sealing said movable portion of said hollow pipe against water; and (e) an accomodating portion provided by said camera body to accommodate said firing portion of said strobe device,
at least one of the confronting surfaces of said accomodating portion and said firing portion being provided with a water draining portion.

6. A watertight camera according to claim 5, wherein said water draining portion is in the form of grooves.

7. A watertight camera comprising:
(a) a camera body;
(b) a strobe device attached to said camera body,
said device including a firing portion movable between a retracted position and a projected position, and an end portion of said firing portion being formed with an arcuate shape;
(c) a hollow pipe connecting said firing portion with said camera body;
said hollow pipe including a rotatable portion for moving said firing portion, and said hollow pipe being mounted to said firing portion at the center of said arc;
(d) an elastic member for sealing said rotatable portion of said hollow pipe against water,
said elastic member exerting a frictional force on said hollow pipe to hold said firing portion stationary in either of the retracted and projected positions; and
(e) an accommodating portion for said firing portion of said strobe device, said portion being provided in said camera body, and being formed with a curved shape in a corresponding portion to said arcuate end portion of said firing portion, and to a flat shape in the remaining portion.

8. A watertight camera according to claim 7, wherein at least one of the confronting surfaces of said accommodating portion and said firing portion is provided with a water draining portion.

9. A watertight camera comprising:
(A) a camera body;
(B) a strobe device attached to said camera body;
(C) a connecting portion making movable a firing portion of said strobe device relative to said camera body;
said connecting portion being freely movable relative to said camera body;
(D) an elastic member for watertightly sealing said connecting portion, said elastic member holding said connecting portion by a frictional force.

10. A camera according to claim 9, wherein said connecting portion is slidable relative to said camera body.

11. A camera according to claim 9, wherein said connecting portion is rotatable relative to said camera body.

12. A watertight camera according to claim 9, further comprising:
(E) an accommodating portion for said strobe device provided by said camera body; and
(F) a water draining portion between the confronting portions of said accommodating portion and said strobe device.

13. A watertight camera according to claim 12, wherein said water draining portion includes a guide portion for the movement of the strobe device.

14. A watertight camera according to claim 9, wherein said elastic member imparts to the connecting member a friction force not less than about $0.78 \times d^2$ (kgf) in which d represents the diameter in centimeters of the connecting member.

15. A watertight camera comprising:
(A) a camera body;
(B) a strobe device attached to said camera body;
(C) a connecting portion making movable a firing portion of said strobe device relative to said camera body;
said connecting portion being freely movable relative to said camera body;
(D) an elastic member for holding said connecting portion by a frictional force.

16. A camera according to claim 15, wherein said connecting portion is slidable relative to said camera body.

17. A camera according to claim 15, wherein said connecting portion is rotatable relative to said camera body.

18. A watertight camera according to claim 15, further comprising:
(E) an accommodating portion for said strobe device provided by said camera body; and
(F) a water draining portion between the confronting portions of said accommodating portion and said strobe device.

19. A watertight camera according to claim 18, wherein said water draining portion includes a guide portion for the movement of the strobe device.

20. A watertight camera according to claim 15, wherein said elastic member imparts to the connecting member a friction force not less than about $0.78 \times d^2$ (kgf) in which d represents the diameter in centimeters of the connecting member.

21. A watertight camera comprising:
(A) a camera body;
(B) a strobe device arranged to be movable relative to said camera body;
(C) an accommodating portion for said strobe device provided by said camera body; and
(D) a water draining portion between the confronting portions of said accommodating portion and said strobe device.

22. A camera according to claim 21, wherein said water draining portion is a groove.

23. A watertight camera according to claim 21, wherein said water draining portion includes a guide portion for the movement of the strobe device.

24. A watertight camera comprising:
(A) a camera body;
(B) a flash device having an end portion which is of arcuate shape;
(C) an accommodating portion provided on the camera body for accommodating the flash device, said accommodating portion having a bottom portion and a side portion both being arranged almost at a right angle relative to each other, and
(D) supporting means for supporting the flash device rotatably about the center of a circle containing the arcuate line of the end portion so as to cause the end portion to displace along from the bottom portion to the side portion of the accommodating portion, said end portion displacing between a first position approaching and opposing the bottom portion of the accommodating portion and a second position approaching and opposing the side portion of the accommodating portion.

25. A camera according to claim 24, further including:
  a water draining portion positioned between the confronting portions of said strobe device and said accommodating portion.

26. A watertight camera according to claim 25, wherein said water draining portion includes a guide portion for the movement of the strobe device.

27. A watertight camera according to claim 24, further comprising an elastic member for frictionally holding the support means.

28. A watertight camera according to claim 27, wherein said elastic member renders the support means water-tight by its elasticity.

29. A camera comprising:
(A) a camera body;
(B) a strobe device attached to said camera body;
(C) a connecting portion making movable a firing portion of said strobe device relative to said camera body;
  said connecting portion being freely movable relative to said camera body;
(D) an elastic member for holding said connecting portion by a frictional force.

30. A camera, comprising:
(A) a camera body;
(B) a flash device having an end portion which is of arcuate shape;
(C) an accommodating portion provided on the camera body for accommodating the flash device, said accommodating portion having a bottom portion and a side portion both being arranged almost at a right angle relative to each other, and
(D) supporting means for supporting the flash device rotatably about the center of a circle containing the arcuate line of the end portion so as to cause the end portion to displace along from the bottom portion to the side portion of the accommodating portion,
  said end portion displacing between a first position approaching and opposing the bottom portion of the accommodating portion and a second position approaching and opposing the side portion of the accommodating portion.

* * * * *